US007788540B2

(12) United States Patent
Merriman et al.

(10) Patent No.: US 7,788,540 B2
(45) Date of Patent: Aug. 31, 2010

(54) TRACKING DOWN ELUSIVE INTERMITTENT FAILURES

(75) Inventors: Loren Merriman, Duvall, WA (US); Gordon Hardy, Seattle, WA (US); Curtis Anderson, Kent, WA (US); Alan T. B. Brown, Ellensburg, WA (US); Richard Wright, Redmond, WA (US); Jared Wilson, Redmond, WA (US); Xun Zhang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 11/700,992

(22) Filed: Jan. 31, 2007

(65) Prior Publication Data

US 2008/0184079 A1    Jul. 31, 2008

(51) Int. Cl.
*G06F 11/00*    (2006.01)
(52) U.S. Cl. .................................................. 714/38
(58) Field of Classification Search .................. 714/38; 717/128–131
See application file for complete search history.

(56) References Cited

U.S. PATENT DOCUMENTS

| | | | | |
|---|---|---|---|---|
| 5,269,014 | A | 12/1993 | Ogino | 395/500 |
| 5,548,718 | A | 8/1996 | Siegel et al. | 395/183.14 |
| 5,703,788 | A | 12/1997 | Shei et al. | 364/488 |
| 6,038,378 | A | 3/2000 | Kita et al. | 395/183.14 |
| 6,243,838 | B1 | 6/2001 | Liu et al. | 714/57 |
| 6,408,403 | B1 | 6/2002 | Rodrigues et al. | 714/38 |
| 6,513,154 | B1 | 1/2003 | Porterfield | 717/101 |
| 6,519,730 | B1 | 2/2003 | Ando et al. | 714/746 |
| 6,523,139 | B1 | 2/2003 | Banning et al. | 714/43 |
| 6,557,120 | B1 | 4/2003 | Nicholson et al. | 714/38 |
| 6,665,824 | B1 | 12/2003 | Ruhlen et al. | 714/57 |
| 6,691,250 | B1 | 2/2004 | Chandiramani et al. | 714/25 |
| 6,742,141 | B1 | 5/2004 | Miller | 714/26 |
| 6,874,099 | B1 | 3/2005 | Balasubramanian et al. | 714/4 |
| 7,000,154 | B1 | 2/2006 | LeDuc et al. | 714/47 |

(Continued)

FOREIGN PATENT DOCUMENTS

EP    1 420 344 A2    5/2004

OTHER PUBLICATIONS

Software Defect Isolation http://tejasconsulting.com/papers/iworks98/defect_isol.pdf Presented at the High-Performance Computing Users Group, Mar. 1998 and Interworks, Apr. 1998.

(Continued)

*Primary Examiner*—Bryce P Bonzo
(74) *Attorney, Agent, or Firm*—Merchant & Gould, P.C.

(57) ABSTRACT

Computing environments, each executing at least one software program, are monitored for failures occurring during execution of the software program. Information associated with the failure, such as an identification of the software program and a failure type describing the failure, is recorded. The failure information is quantified to report the number of times the software program has failed or the number of times a particular failure has occurred. The quantified data may provide help in prioritizing what program or what failures merit investigation and resolution. Reports may be received from failing computing systems stopped at a state following the occurrence of the failure. In response, hold information is checked to determine whether to instruct the failing computing system to hold a state existing upon the occurrence of the failure.

20 Claims, 8 Drawing Sheets

U.S. PATENT DOCUMENTS

| | | | |
|---|---|---|---|
| 7,024,592 B1 | 4/2006 | Voas et al. | 714/47 |
| 7,058,857 B2 | 6/2006 | Dallin | 714/38 |
| 7,058,927 B2 | 6/2006 | Yenne et al. | 717/128 |
| 7,080,287 B2 | 7/2006 | Salem | 714/38 |
| 7,096,388 B2 | 8/2006 | Singh et al. | 714/38 |
| 7,099,797 B1 | 8/2006 | Richard | 702/182 |
| 7,168,008 B2 | 1/2007 | de Bonet | 714/38 |
| 7,490,268 B2 | 2/2009 | Keromytis et al. | 714/38 |
| 7,673,178 B2 | 3/2010 | Merriman et al. | 714/35 |
| 2003/0028856 A1 | 2/2003 | Apuzzo et al. | 717/124 |
| 2004/0060044 A1 | 3/2004 | Das et al. | 717/171 |
| 2004/0078686 A1 | 4/2004 | Toyooka et al. | 714/38 |
| 2004/0139374 A1 | 7/2004 | Meaney et al. | 714/48 |
| 2004/0194063 A1 | 9/2004 | Pereira | 717/124 |
| 2005/0081118 A1 | 4/2005 | Cheston et al. | 714/47 |
| 2005/0188269 A1 | 8/2005 | El-Shimi et al. | 714/38 |
| 2005/0262472 A1 | 11/2005 | Wood et al. | 717/102 |
| 2006/0150008 A1 | 7/2006 | Srinivas et al. | 714/12 |
| 2006/0190770 A1 | 8/2006 | Harding | 714/38 |
| 2007/0245313 A1 | 10/2007 | Hardy et al. | 714/124 |
| 2008/0098264 A1 | 4/2008 | Day et al. | 714/38 |
| 2008/0184075 A1 | 7/2008 | Merriman et al. | 714/38 |

OTHER PUBLICATIONS

Finding the root cause of application problems is difficult and time consuming http://www.radview.com/Products/RCA-WebLOAD-AnalyzerOverview.aspx Last accessed Apr. 4, 2007.

Finding Failure Causes through Automated Testing http://www.irisa.fr/lande/ducasse/aadebug2000/proceedings/05zeller.ps.gz Last accessed Jul. 22, 2000.

Tracking down Software Bugs Using Automatic Anomaly Detection by S. Hangal and M. S. Lam http://suif.stanford.edu/papers/Diduce.pdf In *Proceedings of the International Conference on Software Engineering*, pp. 291-301, May 2002.

U.S. Appl. No. 11/404,679, filed Apr. 14, 2006 entitled "Failure Tagging".

U.S. Appl. No. 11/701,122, filed Jan. 31, 2007 entitled "Break and Optional Hold on Failure".

Zeller, Isolating cause-effect chains from computer programs http://portal.acm.org/citation.cfm?id=587053&coll=ACM&dl=ACM&CFID=75919783&CFTOKEN=92791909; Nov. 18-22, 2002, pp. 1-10.

Orso et al., Testing and debugging: Isolating relevant component interactions with JINSI; http://portal.acm.org/citation.cfm?id=1138915&coll=ACM&dl=ACM&CFID=75919783&CFTOKEN=92791909, May 23, 2006, pp. 3-9.

Office Action dated Jun. 10, 2009, in U.S. Appl. No. 11/701,122.

Antonia Bertolino et al., "Assessing the risk due to software faults: estimates of failure rate versus evidence of perfection," Received: May 7, 1998; Revised: Sep. 2, 1998; Accepted: Sep. 5, 1998, Wiley InterScience: Journal: Abstract, Internet site, 2 pages.

Feng-Zhong Zou, "A change-point perspective on the software failure process," Received Aug. 14, 2002; Revised: Mar. 6, 2003, Wiley InterScience: Journal: Abstract, Internet site, 2 pages.

Mehmet Sahinoglu et al., "Alternative Parameter Estimation Methods for the Compound Poisson Software Reliability Model with Clustered Failure Data," Received: Apr. 24, 1994; Revised: Dec. 28, 1995, Wiley InterScience: Journal: Abstract, Internet site, 2 pages.

John Donovan et al., "Total System Reliability: Integrated Model for Growth and Test Termination," Received: Jul. 20, 2003; Revised: Jan. 22, 2004, Wiley InterScience: Journal: Abstract, Internet site, 2 pages.

TRACKING DOWN ELUSIVE INTERMITTENT FAILURES

BACKGROUND

In developing software, it is typical that errors or "bugs" in the code will be discovered. Hopefully, the errors are discovered during software testing before the software is released to avoid user frustration or the need to create and apply patches, fixes, or corrected versions. Software testing may involve simulated user or multi-user interaction with the software being developed, during which the software is a script of test data is applied to the software to simulate actual use and, hopefully, identify errors in the software.

Some errors prove easier to diagnose than others. For example, if a particular type of error arises at the same point in executing the test data, isolating the cause of the error may prove relatively easy. In other words, if the same error arises in executing the same instruction or group of instructions at the same point in the test, then one can infer that execution of the software to this point has resulted in some particular condition that the instruction or group of instructions will result in the error.

On the other hand, errors that result in intermittent failures are more difficult to detect, let alone isolate and correct. Intermittent failures, by definition, do not occur each time the same instruction or group of instructions executes. When the error arises, the test that resulted in the error may be rerun, but this time, the error does not arise. Nonetheless, the error may continue to arise from time to time, yet in such a sporadic fashion that makes it difficult to even quantify the instances of the failure. As a result, it may prove much more difficult to correct the error when it is difficult to identify and isolate the conditions that, intermittently, cause the failure to manifest.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods, computer-readable media and a system for facilitating debugging of a software program by monitoring the execution of a software program executing in a plurality of computing environments or over a number of executions to identify what failures occur. Although the failures may only occur intermittently, by recording the failure information for a number of executions of the software program, the prevalence of how many such failures occur can be determined. Moreover, by notifying persons who have registered an interest in failures occurring in a particular software program or in occurrences of a particular failure type, and allowing those persons to access the computing environment where the failure occurred, the failures may be more readily resolved.

In one implementation, a plurality of computing environments executing at least one software program are monitored for notification of an occurrence of a failure during execution of the software program. Information associated with the occurrence of the failure, such as an identification of the software program and a failure type describing the failure is recorded. The failure information is then quantified to maintain a total of the number of times the software program has failed or the number of times a particular failure has occurred. The quantified data describing the number of times a particular software program has failed or the number of times a particular failure type has been experienced can be ranked to help prioritize what program or what failures merit investigation and resolution.

In monitoring for the occurrences of failures, reports may be received from failing computing systems that are paused at a failure state following the occurrence of the failure. In response, hold information is checked to determine whether to instruct the failing computing system to hold at the failure state. Based on this information, the failing system is instructed to hold at the failure state to facilitate investigation. The hold information may include submission data submitted upon initiating the execution of the software program that indicates execution is to be held at the failure state upon occurrence of a failure. Alternatively, the hold information may include failure tag data indicating the execution of the software program is to be held upon occurrence of a selected failure type.

When one or more additional computing environments execute an additional software program that interacts with the software program that has failed, such as another instance of the software program that has failed or a program that provides services to the failing software program, the additional computing environments may also be instructed to hold. Thus, if the cause of the failure is related to the state or the actions of the additional software program or programs, holding the state of these additional computing environments may further facilitate resolution of the problem.

Upon the occurrence of a failure, a user named in the hold information is sent a failure message to notify the user of the failure. The failure message may include access information to facilitate the user gaining access to the failing computing system in order to investigate the failure state or otherwise investigate the occurrence of the failure. The failing computing environment may be held at the failure state until a specified time interval has lapsed, the failure state has been investigated, or an instruction to discontinue the hold is given.

If the failing computing environment was allocated to an original user prior to the occurrence of the failure and the computing environment is being held, an additional computing environment is allocated to the original user to replace the computing environment being held.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in three-digit reference numerals refers to the figure in which the referenced element first appears.

DETAILED DESCRIPTION OF IMPLEMENTATIONS

This detailed description describes implementations of monitoring execution of one or more software programs to track occurrences of failures and facilitate resolution of the problems giving rise to the failures.

Examples referenced in the following discussion describe an implementation of monitoring execution of a software program for occurrences of failures employed in a testing environment. The exemplary testing environment, which is further described below, includes a plurality of networked computing environments configured to execute a plurality of tests of one or more software programs. As is understood by those skilled in the art, executing tests on a software program a plurality of computing environments allows for the software program to be tested more thoroughly and efficiently. However, it should be noted that implementations of monitoring execution of software programs for occurrences of failures also would be useful in production environments and other situations. Thus, the foregoing description provides examples of how an implementation of monitoring execution of software programs for occurrences of failure might be used; however, this description but does not portray the sole application of the methods or systems described.

Illustrative Operating Environment

Figure 1:
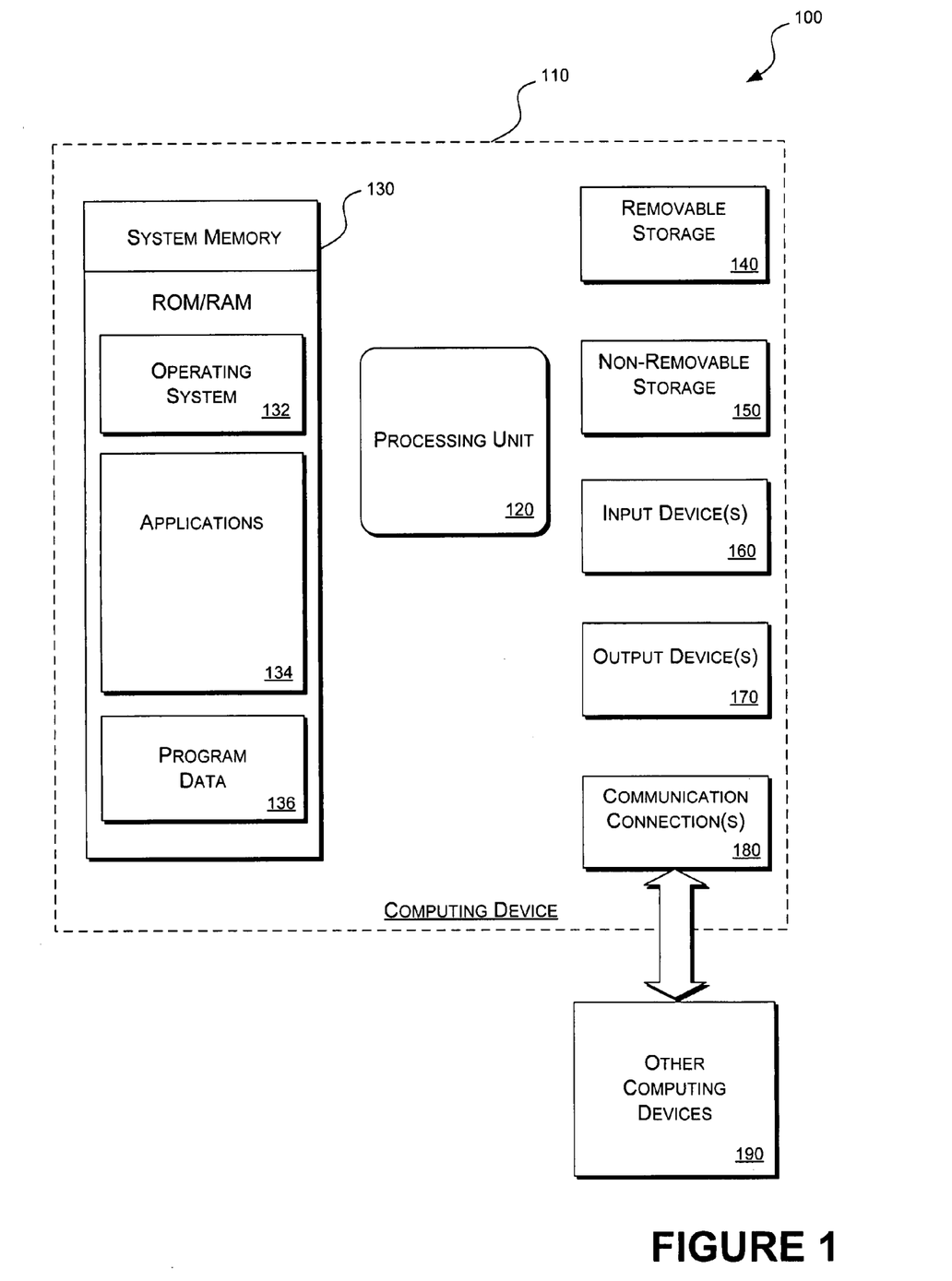
FIG. 1 is a block diagram of an operating environment for implementations of computer-implemented methods, computer-readable media, and systems as herein described.

Implementations of monitoring execution of software programs may be supported by a number of different computing environments on which software may be executed or tested. FIG. 1 is a block diagram of a representative operating environment 100.

Referring to FIG. 1, an exemplary operating environment 100 includes a computing device, such as computing device 110. In a basic configuration, the computing device 110 may include a stationary computing device or a mobile computing device. The computing device 110 typically includes at least one processing unit 120 and a system memory 130. Depending on the exact configuration and type of the computing device 110, the system memory 130 may be volatile (such as RAM), non-volatile (such as ROM, flash memory, and the like) or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140, and the non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also include one or more input devices 160 such as a keyboard, mouse, pen, voice input device, touch input device, etc. One or more output devices 170, such as a display, speakers, printer, etc., may also be included.

The computing device 110 also includes one or more communication connections 180 that allow the device to communicate with other computing devices 190, such as over a network or a wireless network. The one or more communication connections 180 represent an example of communications media. Communications media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Exemplary Environment for Executing Software Programs Using Break and Hold

Figure 2:
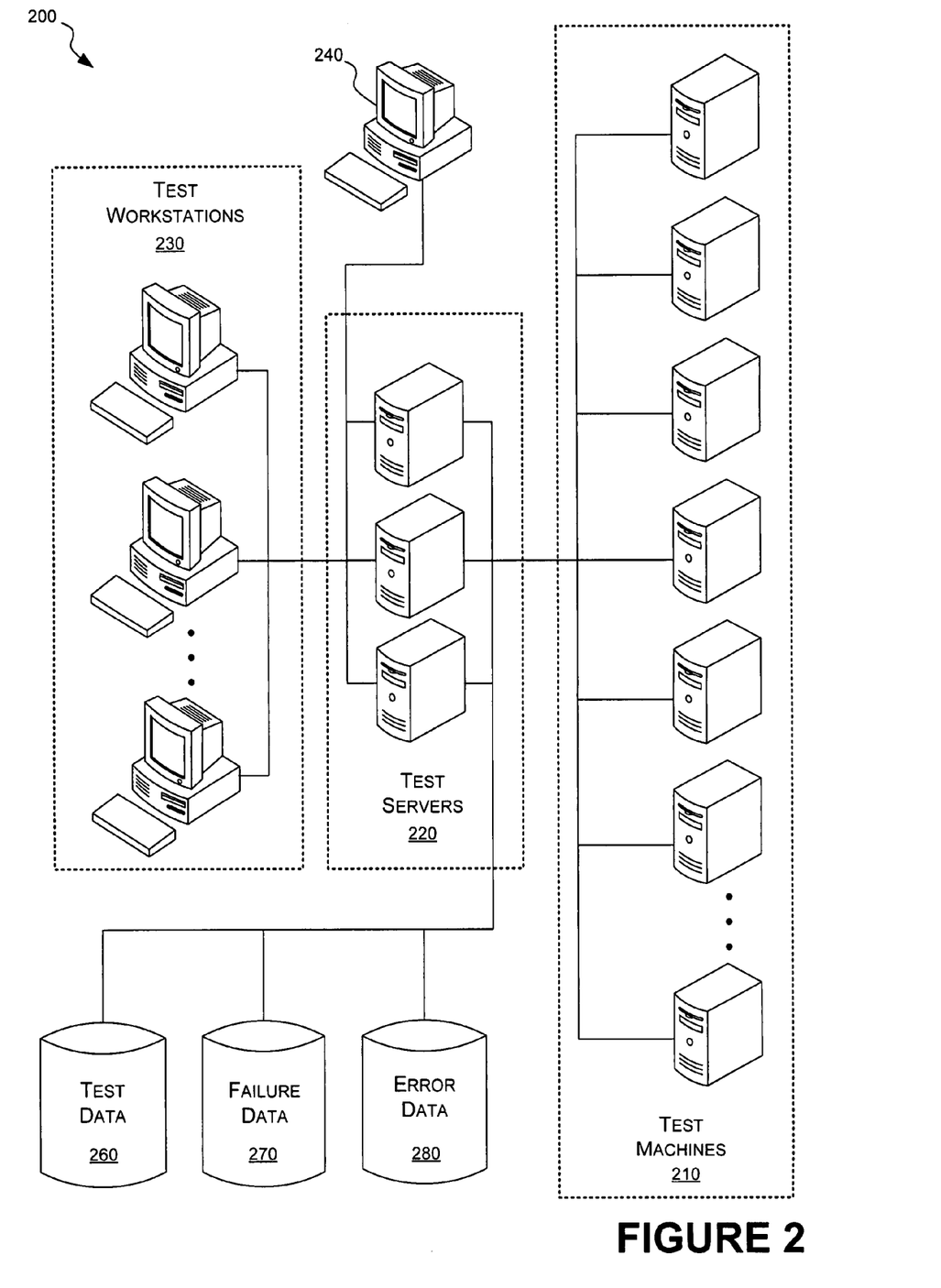
FIG. 2 is a network diagram of a testing environment including a plurality of computing environments to facilitate the testing of one or more software programs, as well as the administration and monitoring of the testing.

FIG. 2 illustrates a testing environment 200 configured to test one or more software programs. Implementations of monitoring execution of software programs for occurrences of failure are useful in such a testing environment to assist in the debugging of software. On the other hand, implementations of monitoring execution of software programs for occurrences of failure also are useful in other contexts where it might be useful to track and identify problems arising in a networked computing environment. For example, in a server farm or any other production environment, when a system experiences a failure, it may be useful in solving the problem and preventing future failures to track which programs are failing or what type of failures are occurring, and to hold the failing systems at a point of failure to facilitate debugging.

The testing environment 200 includes a plurality of test machines 210. Each of the test machines 210 includes a computing environment including at least a portion of the attributes and functionality of the computing environment 100 described with reference to FIG. 1. It will be appreciated by those skilled in the art that, in a testing environment, each of the plurality of test machines may not be equipped with, for example, input devices 160, output devices 170, or removable storage 140 because the input is supplied to each of the plurality of test machines 210 via a communication connection from the test servers 220. It should also be appreciated that, while a computing environment can be conceived as a single test machine or test computer executing a software program, a computing environment may include multiple physical computers executing cooperatively to serve as a computing environment. Alternatively, a single computing system or test machine may be able to support multiple operating environments or partitions, each of which is its own computing environment. Thus, while computing environments and test machines may be used interchangeably in this description, implementations of monitoring execution of software programs are not restricted to situations in which each computing environment includes a single computer or vice versa.

The test machines 210 are in communication with one or more test servers 220 that administer the operation of the software tests. For example, the test servers 220 identify which of the test machines 210 will run which tests, initiate the tests, and report the results. The test servers 220 are in communication with a plurality of test workstations 230 used by personnel who desire to test software programs. When a user of a test or workstation 230 submits a test, the test servers 220 prioritize, schedule, and prepare the tests for execution. The test servers 220 also are in communication with an administrator workstation 240 that allows for control and management of the test servers 220 as well as the test machines 210 and the test workstations 230.

The test servers 220 and, in turn, the test machines 210, are in communication with a plurality of data stores including test data 260, failure data 270, and error data 280. The test data 260 includes, for example, test scripts including the instructions used to provide input or commands to test the software being tested. The failure data 270 specifies programs or failure types the testing personnel wish to investigate, as is described further below. The error data 280 is a repository for storing information about failing programs and failures that occur, such as logs written by failing machines.

In implementations of monitoring execution of software programs for occurrences of failures described below, a monitoring system may include the test servers 220 operating a software program that receives notifications of failure and responds to those failures as described below. The test servers 220 may record failure information in the error data 280 for reporting and analysis. The test servers 220 also may notify users of test workstations 230 regarding occurrences of failure in which the users have identified interest in the results of tests of a particular software program or in occurrences of particular types of failures. The test servers 220 also may facilitate remote access by the users of the test workstations 230 to one or more test machines 210 that have experienced failures.

The test machines 210 each may operate under control of a test client program which controls the execution of the software program executing on the test machine 210 and communicates with the test data 260 to administer the test and communicate with a monitoring system. Operation of the test client program and its interaction with the monitoring system is described in U.S. patent application Ser. No. 11/701,122, for "BREAK AND OPTIONAL HOLD ON FAILURE," filed on Jan. 31, 2007, the disclosure of which is incorporated in this application by reference.

Modes of Monitoring Execution of a Software Program for Occurrences of Failures

Figure 3:
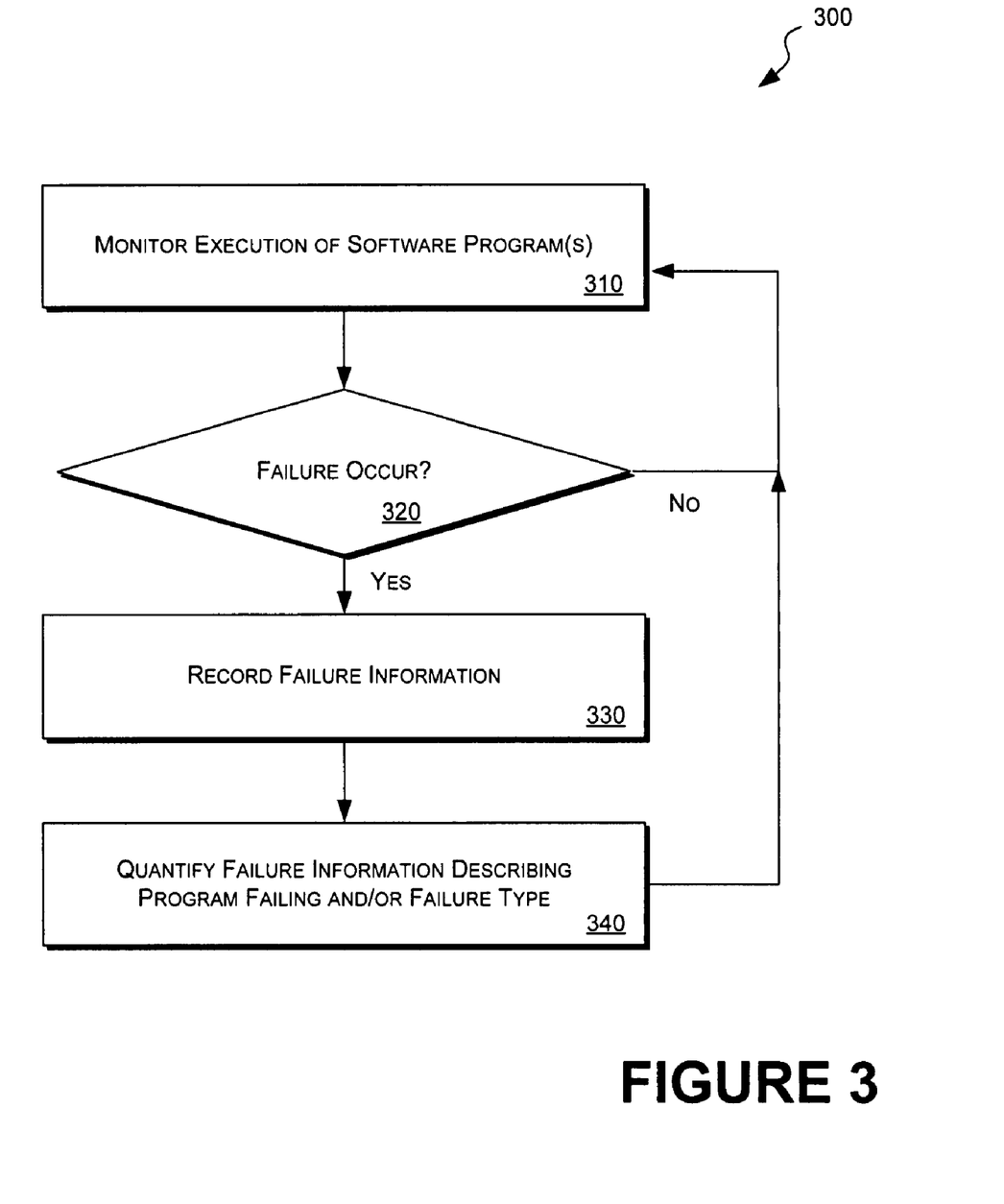
FIGS. 3 and 4 are flow diagrams of processes for monitoring the execution of a software program and holding the state of a computing environment upon the occurrence of a failure.

FIG. 3 presents a flow diagram 300 of an implementation of monitoring execution of one or more software programs for occurrences of failures. At 310, execution of one or more software programs is monitored. For example, the monitoring may take the form of awaiting a message from one of a plurality of computing environments on which the one or more software programs are executing, as described with reference to the testing environment 200 of FIG. 2. At 320, it is determined if a failure has occurred, as might be indicated by the receipt of a failure notification. If not, the flow diagram 300 loops to 310 to continue monitoring the execution of the software program.

On the other hand, if it is determined that a failure has occurred, at 330, the failure information is recorded. The information recorded may include identification of the software program that failed, or the type of failure reported, as is described further below. At 340, the recorded information is quantified. For example, quantifying the information may include how many times a particular software program has failed, or how many times a particular type of failure has been recorded. The recording and quantifying of this information is described in more detail below with reference to FIGS. 5 and 6. Once the information is quantified at 340, the flow diagram 300 loops to 310 to continue monitoring the execution of the software program or programs for occurrences of failure.

Figure 4:
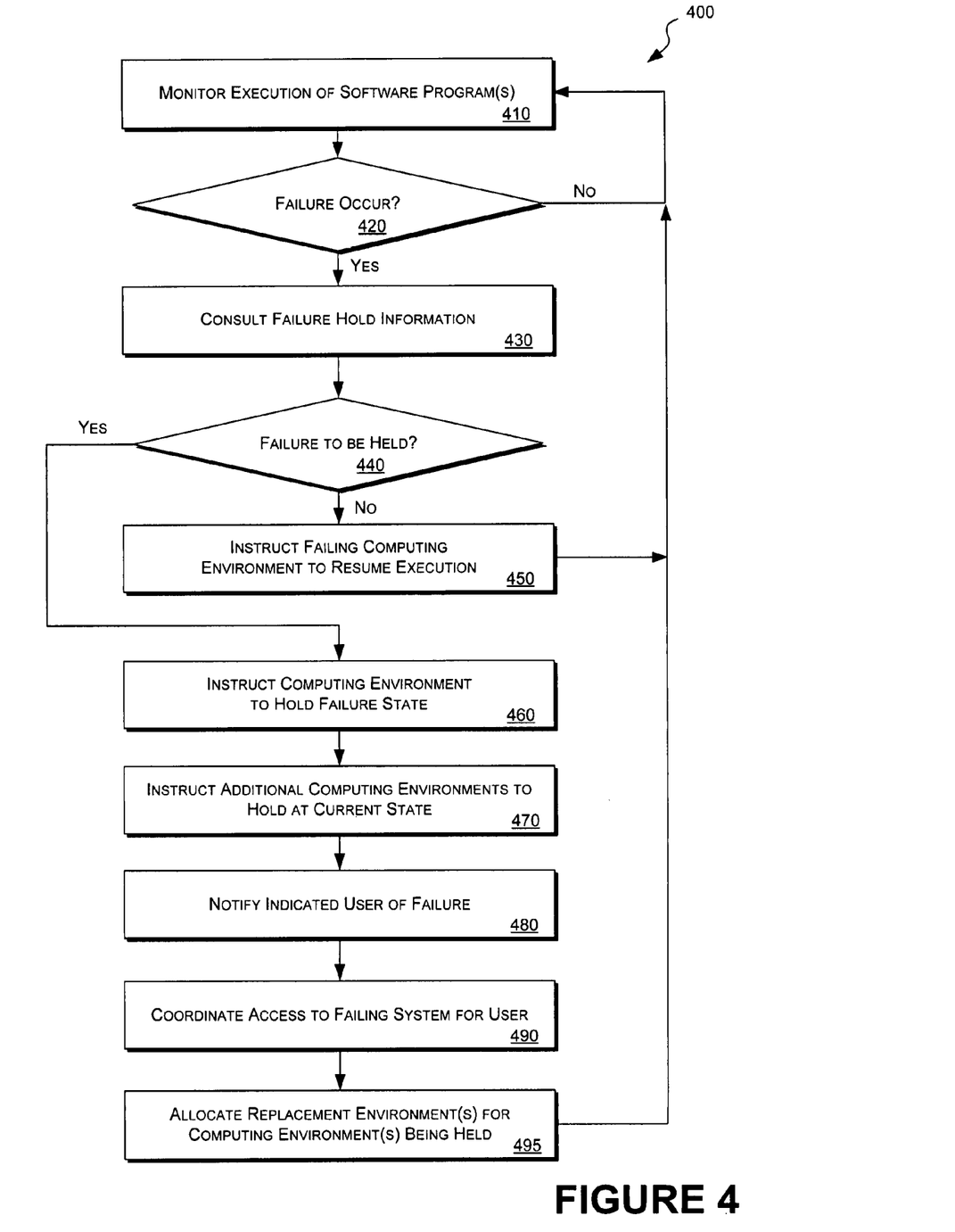

FIG. 4 presents a flow diagram 400 of another implementation of monitoring execution of one or more software programs for occurrences of failure. The implementation of FIG. 4 details interaction between a monitoring system and computing environments in which software programs are being tested to illustrate how the monitoring of the execution of the software programs also has the capability to selectively hold the failing computing environment to facilitate investigation of the cause of the failure to assist in debugging.

At 410, execution of one or more software programs is monitored. At 420, it is determined if a failure has occurred. If not, the flow diagram 400 loops to 410 to continue monitoring the execution of the software program.

On the other hand, if it is determined that a failure has occurred, at 430, failure hold information is consulted to determine whether the computing environment reporting the failure should be held or directed to continue execution. The failure hold information, for example, may include information stored in the failure data 270 (FIG. 2). The failure hold information may include test or job submission information specifying when occurrences of failure for a particular software program being tested should be held. For example, upon submitting a selected version of the software program for testing, the test submission information may indicate that the test machine that first experiences an occurrence of a failure should be held for further investigation. Alternatively, the submission information may specify that no machines be held and, instead, that the state of the test machine be stored in the error data 280 for later investigation. Further alternatively, the submission information may specify that a selected number of machines experiencing failures should be held.

The failure hold information in the failure data 270 also may include failure tag information that identifies a type of failure that testing personnel wish to investigate. The creation and use of failure tags is described in a commonly-owned co-pending U.S. patent application entitled "Failure Tagging," filed on Apr. 14, 2006, and assigned Ser. No. 11/404,679. For one example, a certain type of intermittent failure resulting in a particular failure type may occur frequently enough that resolving the failure becomes a priority. Thus, the failure data 270 may specify that, when a test machine 210 executing a software program reports the failure type of interest, that failing machine will be held for further investigation. Again, alternatively, the failure data 270 may specify that machines experiencing the selected failure not be held but instead instruct that information reflecting the state of the test machine at the occurrence of the failure be stored in the error data 280 for later investigation. Further alternatively, the failure tag data may specify that a specified number of test machines on which a failure of the identified failure type be held for subsequent investigation. For example, the failure data 270 may request that the first five machines that experience a failure of the identified failure type be held for investigation, as opposed to holding only the first machine that experiences the failure. Also alternatively, failure tag information or other the failure data 270 may specify that a failing test should be re-run on the failing system to determine if the failure reoccurs.

Based on the failure hold information consulted at 430, at 440, it is determined if the computing environment should be held at its current state. If not, at 450, the failing computing environment is instructed to resume execution, and the flow diagram 400 loops to 410 to continue monitoring for occurrence of failures. The failure hold information may indicate that one or more machines already have been held to facilitate investigation. Alternatively, the failure that has occurred may not be of sufficient priority to be held for investigation.

On the other hand, if it is determined at 450 that the computing environment experiencing the failure should be held, at 460, the computing environment is instructed to hold at the state following the occurrence of the failure. The failure hold information may indicate that a request has been made to hold the software program upon the occurrence of a failure. Alternatively, a particular type of failure has occurred for which a failure tag requests a computing environment experiencing that failure be held for investigation. To hold the state of the computing environment experiencing the failure at 460, a specific instruction to hold the state may be issued. Alternatively, if the computing environment has been configured to hold the state following the occurrence of the failure, not sending an instruction to the computing environment directing it to resume execution will serve as instructing the computing environment to hold its state. The holding of the computing environment may be continued for a predetermined period of time, such as 24 hours or 72 hours, to allow an interested party to study the state of the held computing environment to try to determine the cause of the failure. In the case where one computing system supports multiple computing environments, only some of the resources dedicated to the computing environment being held might be wasted. In any case, the time limits ensure that computing resources are not unnecessarily removed from use.

At 470, one or more additional computing environments interacting with the failing computing environment may be instructed to hold a current state. For example, the software program being tested on the computing environment that has failed is an e-mail client program that interacts with an e-mail server program executing in another computing environment or with other e-mail clients executing in still other computing environments. Because the failure occurring may result from the interaction with the programs executing in these other computing environments, and the failure may actually lie with one or more of those other systems, it may be appropriate to hold those other computing environments as well as the computing environment for which the occurrence of failure was reported. Whether holding other computing environments is appropriate in which of those environments should be held may be described in the failure data 270 (FIG. 2) in job submission data, failure tag data or some other information which also may provide information as to what other computing environments are operating software programs that interact with the software program that has failed At 480, an indicated user is notified of the occurrence of the failure. As previously described, the failure hold information may include submission information or failure tag data that identifies a user who has requested notification when a particular software program has failed or when a particular type of failure has occurred. This indicated user or group of users will be notified of the occurrence of the failure. Again, notification may be sent to one or more individually-designated persons, a designated group of persons (such as a development team), or a combination of one or more individuals and one or more groups. Also, in addition to notifying individuals or groups using e-mail, notification could be effected by paging designated persons, sending them instant messages, phoning the designated persons, or using any other communication system. In one implementation, the indicated user is notified by e-mail, as described below with reference to FIGS. 5 and 6.

After being notified of the failure at 480, at 490, access to the failing system is coordinated to allow the user to investigate the computing environment experiencing the failure. In one implementation, remote access is coordinated for the indicated user to allow the user to access the state of the failing computing environment to attempt to identify the cause of the failure. Coordination of this access is described with reference to FIG. 6.

At 495, a replacement computing environment may be allocated to the job or test to replace the computing environment being held. For example, if a user requires several computing environments to process a job or run a test and one or more of those machines experiencing a failure is held, it may be desirable to replace the held machine to facilitate the completion of the job or test. Thus, if there is a computing environment that is idle, it may be allocated to replace a held machine so that the work of the user to whom the machine was originally allocated will not be undermined by the holding of a machine that has experienced a failure. Alternatively, if there is not an idle computing environment that may be allocated, priority may be established such that a next computing environment to become available may be allocated to the original user of the now-held machine.

Once a replacement computing environment is allocated, the flow diagram 400 loops to 410 to continue monitoring the execution of one or more software programs, awaiting notice of occurrences of failure.

Quantification of Failures of Software Programs and/or Failure Types

Figure 5:
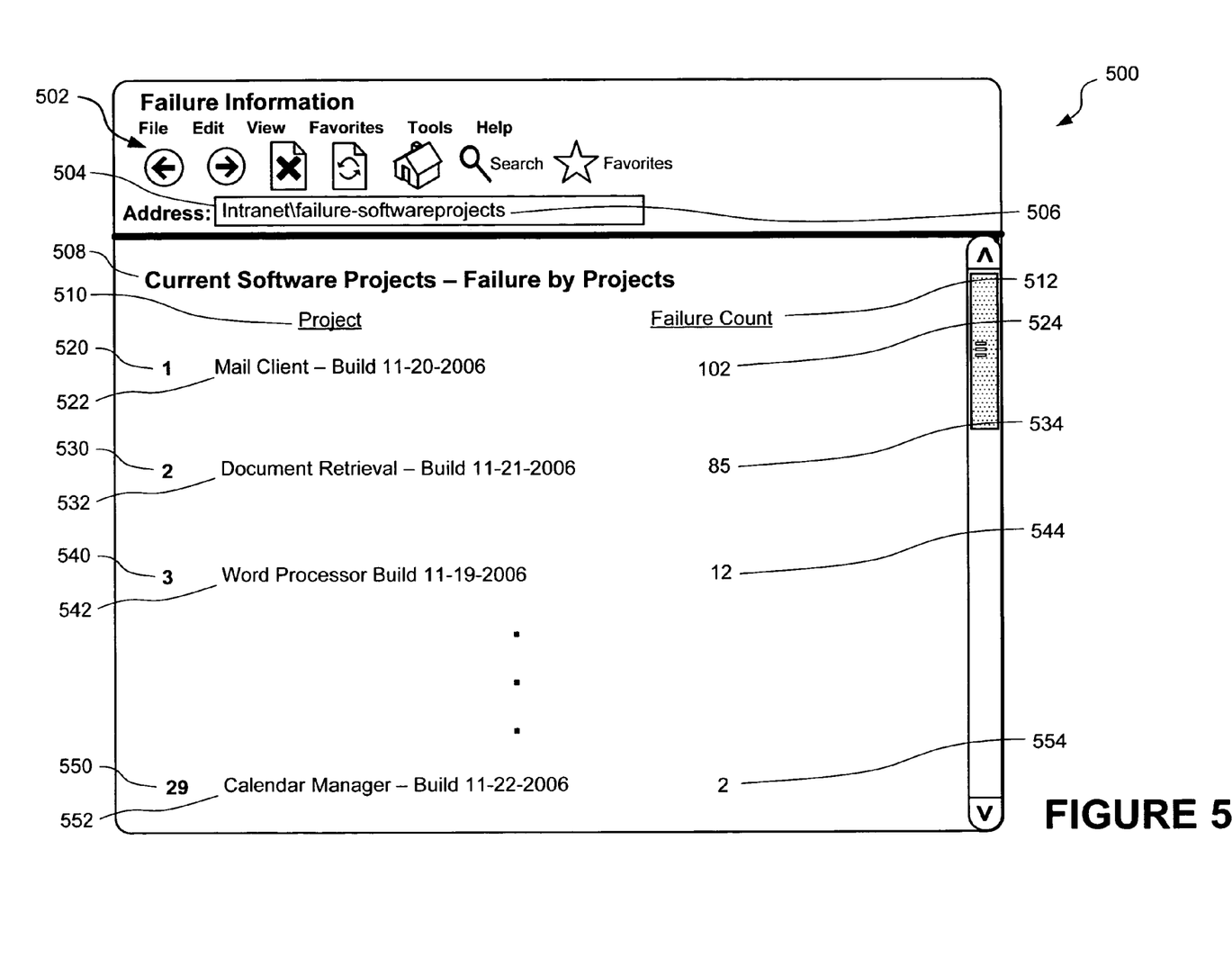
FIG. 5 is a screen display tracking a number of occurrences of failure experienced by a plurality of software programs.
Figure 6:
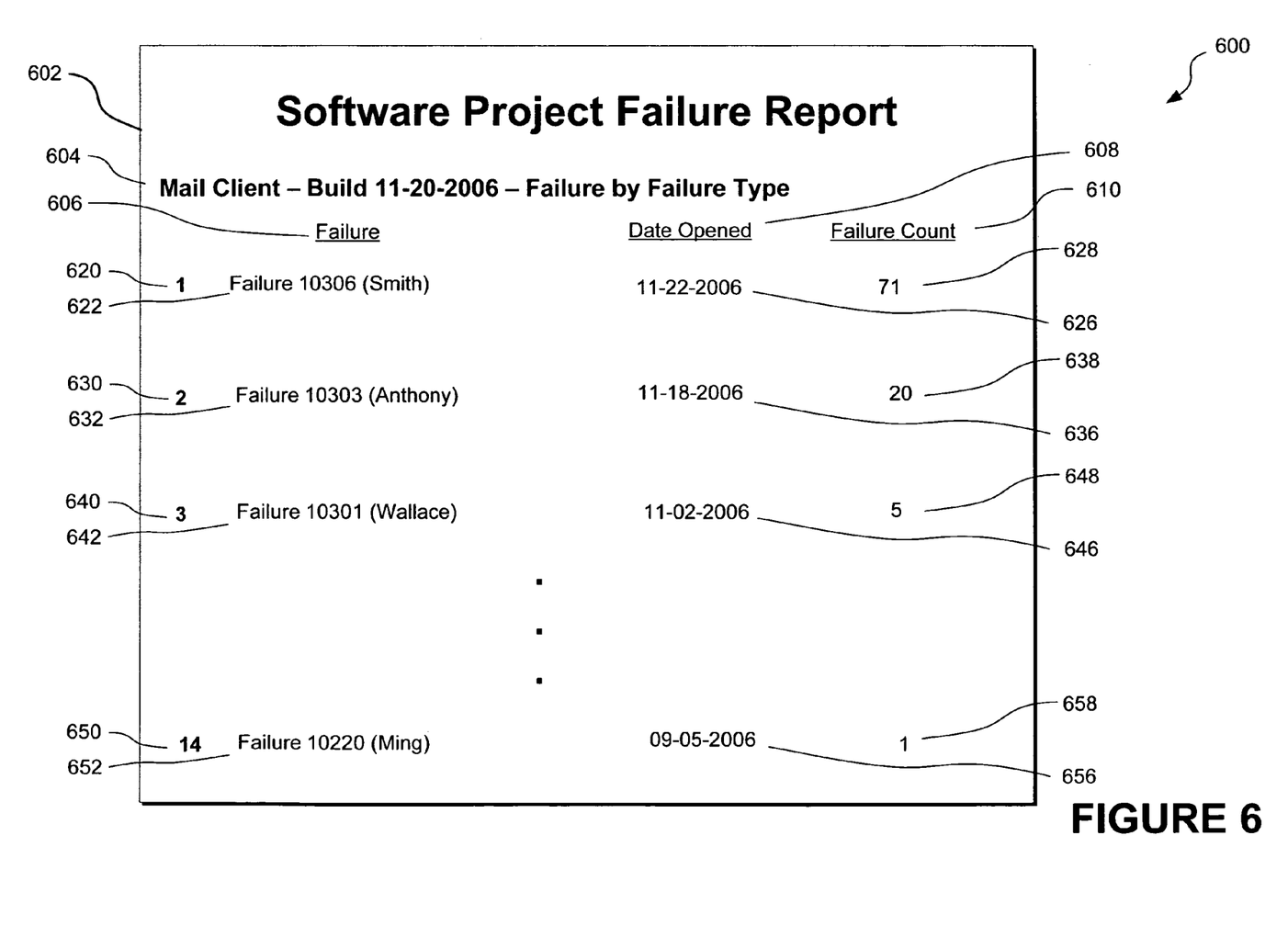
FIG. 6 is a report tracking and ranking a number of occurrences of a particular failure type for a software program.

FIGS. 5 and 6 present quantified reports of software programs that have failed or types of failures that have been reported, respectively. In presenting quantified information regarding occurrences of failures, users can identify which software programs exhibit the most problems or which failures are most common and, thus, be prioritized for resolution.

It should be noted that the ability to quantify the types of failures that occur may be particularly useful in resolving intermittent failures. Because intermittent failures occur sporadically, it can be difficult to isolate their causes. Moreover, because such failures do not occur regularly, individual users or groups of users that experience the occurrence of such a failure may not realize the frequency with which they occur and, thus, do not recognize that they may present a significant concern. However, when occurrence of such failures can be totaled for a number of computing environments, the prevalence of the occurrence of such faults can be readily discerned and their resolution can be given due priority.

FIG. 5 shows a failure information screen 500. The failure information screen 500 is presented as a web page such as a user might access with a web browser application 502. To access the failure information screen 500, a user might use the address field 504 to specify an intranet address 506 where such failure information is collected within an enterprise.

The failure information screen 500 bears the title 508 "Current Software Projects—Failure by Projects" to represent a development environment in which a number of different software projects or software programs are under development. In the exemplary failure information screen, the projects 520, 530, 540, and 550 reported are presented in a list presenting the project name 510 and the failure count 512 for each project. Specifically, the failure information screen 500 displays a report listing the projects 510 in descending order according to the failure count. As a result, the projects 520, 530, 540, and 550 are ranked according to which of the projects 520, 530, 540, and 550 has experienced the largest failure count 512.

More specifically, the first project 520 listed carries the designation "Mail Client—Build 11-20-2006" 522 which has experienced a failure count 512 of 102 failures 524. The second project 530 listed carries the designation "Document Retrieval—Build 11-21-2006" 532 which has experienced a failure count 512 of 85 failures 534. The third project 540 listed carries the designation "Word Processor—Build 11-19-2006" 542 which has experienced a failure count 512 of a relatively few 12 failures 544. The fourth project 550 listed carries the designation "Calendar Manager—Build 11-22-2006" 552 which has experienced a failure count 552 of only 2 failures 554.

By quantifying the failure count 512 for each of the projects, users of the failure information screen 500 can discern at a glance which software programs have experienced the greatest number of failures, and the number of failures may prove useful in prioritizing resolution of problems among the various projects. Thus, reviewing the failure information screen 500 of FIG. 5, one would conclude that the first project 520 and its 102 failures 524 therefore merits the most attention in addressing its errors. The second project 530 and its 85 failures 534 also might be worthy of scrutiny. On the other hand, it may be decided that the third project 540 and its 12 failures 544 can wait to be debugged because whatever problems are manifest in the first project 520 and the second project 530 have resulted in many more failures. However, resolving the 2 failures 554 reported for the fourth project 550 poses relatively no urgency.

The information presented in the failure information screen 500 may prove very helpful to persons tasked with resolving software failures. For example, persons working with the third project 540, in their subjective experience, may believe the third project 540 has experienced many occurrences of failure. However, with the failure count 512 being tracked for each of the projects 520, 530, 540, and 550, the quantified failure information presents a clearer picture of the relative occurrences of failure for each of the projects. As a result, debugging and other resolution efforts can be objectively and intelligently prioritized, rather than relying on subjective judgments as to which of the projects seems to result in the highest number of occurrences of failure.

FIG. 6 presents a printed failure report 600 that details other failure information. The printed failure report 600 is presented as a hardcopy document 602. Comparing the printed failure report 600 with the failure information screen 500 of FIG. 5, it should be noted that implementations of monitoring software programs for occurrences of failure can provide quantified output data in a visually displayed form, a printed form, or any other suitable form.

Specifically, the failure report 600 quantifies and ranks failure information for each of the number of tracked failure types. The failure report 600 presented for example lists the failure types occurring in the execution (or testing) of a single software project as reflected in the title 604 "Mail Client—Build 11-20-2006—Failure by Failure Type." For the software project that is subject of the failure report 600, quantified failure data is listed by failure type 606, a date 608 on which a failure tag was opened for each failure type, and a failure count 610 presenting how many times a failure of each failure type has occurred.

For example, the listed failure types 606 include a first failure 620 comparing the designation 622 "Failure 10306 (Smith)" which, in this implementation, presents a failure code associated with the failure, 10306, and the name of an individual, Smith, creating a failure tag describing the failure. A failure tag for the first failure 620 was opened on 11-22-2006 626. The failure count 610 for the first failure 620 shows the failure occurred 71 times 628. The failure count 610 for the second failure 630, designated as "Failure 10303 (Anthony)" 632, for which the date opened 608 of the failure tag was 11-18-2006 636, shows the failure occurred 20 times 638. The failure count 610 for the third failure 640, designated as "Failure 10301 (Wallace)" 642, for which the date opened 608 of the failure tag was 11-02-2006 646, shows the failure occurred 5 times 648. The failure count 610 for the fourth listed failure 650, designated as "Failure 10220 (Ming)" 652, for which the date opened 608 of the failure tag was 09-05-2006 656, shows the failure occurred 1 time 658.

From the information presented in the failure report 600, one can see that the first failure 620 may present the most significant problem because, despite the failure tag listing a date opened 608 more recent than any other failure tag, the first failure 620 has, by far, occurred the most frequently, occurring 71 times 628. In contrast, the fourth failure 650, which has a failure tag having a date opened 608 earlier than the other projects, occurred only 1 time 658. In this manner, the failure report makes it easy to determine which failure or failures listed in the software project failure report 600 occur most often and, therefore, indicate how their resolutions should be prioritized.

Notification of Occurrences of Failures

Figure 7:
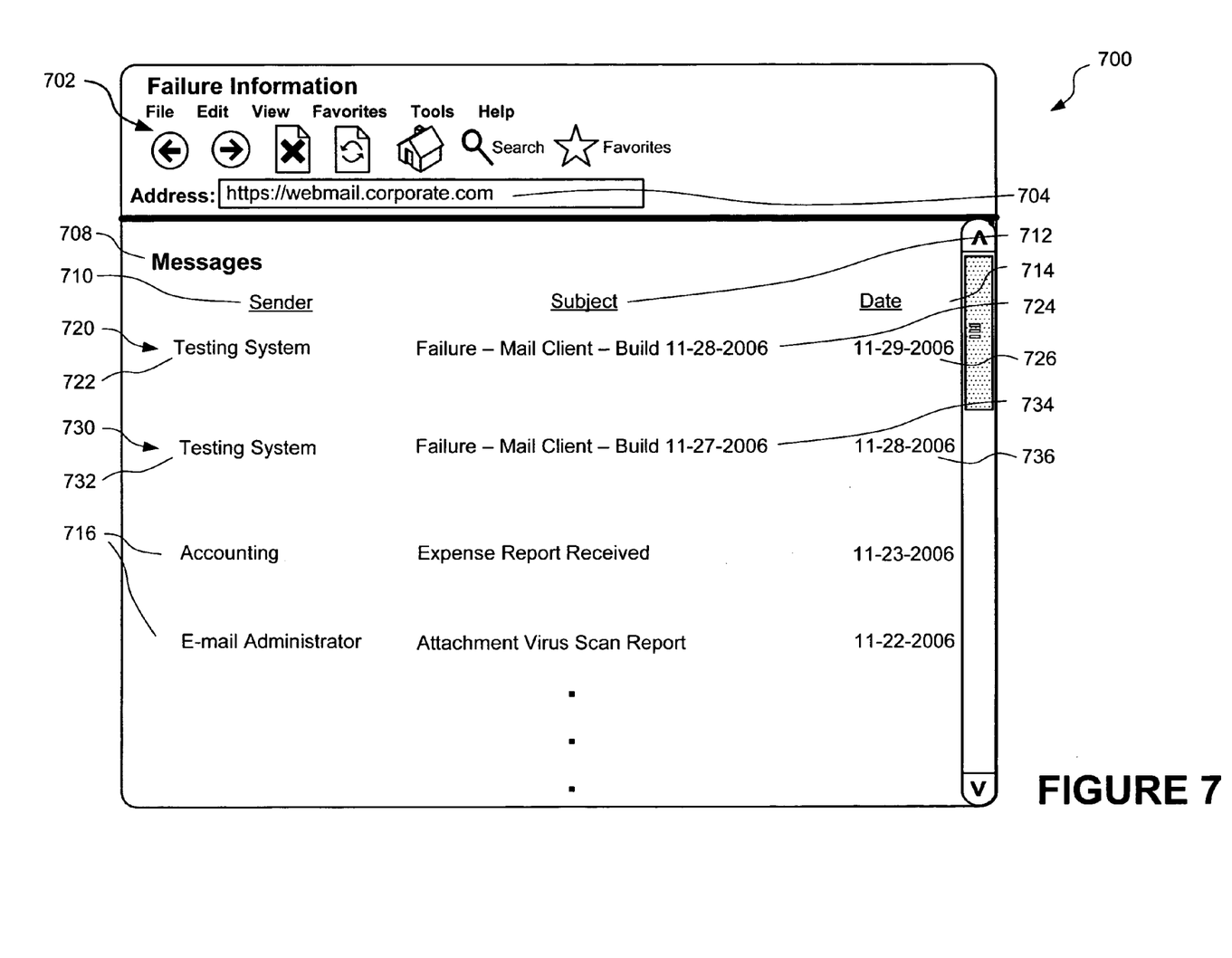
FIG. 7 is a screen display of an e-mail inbox showing receipt of a failure message reporting an occurrence of failure to a user.
Figure 8:
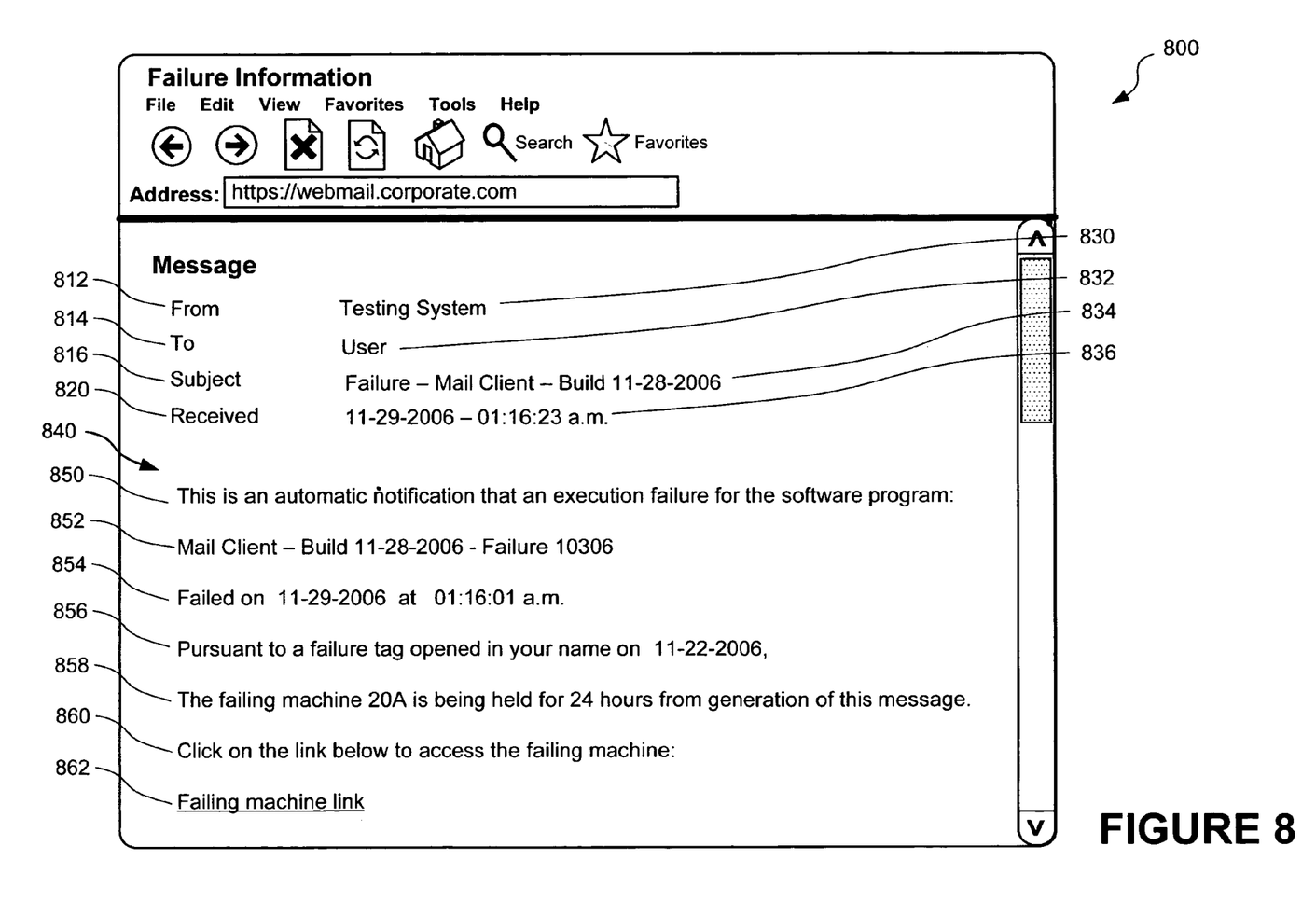
FIG. 8 is a screen display of a message reporting information about the occurrence of the failure and providing information enabling the user to access the computing environment that experienced the occurrence of failure.

FIGS. 7 and 8 illustrate an implementation of a system for monitoring execution of software for the occurrence of failures that provides notification to a specified individual. The individual who receives the notification may be an individual who opens a failure tag for a particular error, an individual who submits the software program for testing, or another individual interested in or responsible for resolving software failure.

FIG. 7 shows an e-mail inbox screen 700 of an individual who has requested a failure notification. The e-mail inbox screen 700 shows a "web mail" inbox that is accessed using a web browser 702 to access an e-mail system at a specified internet or intranet address 704. However, the e-mail inbox could be any other interface presented by a computer, portable computer, mobile telephone or smart phone, personal digital assistant, pager, or any other type of device capable of displaying messages. In addition, although not shown in FIG. 7, the notification could be received in the form of an automated telephone call directed to a specified number. Implementations of providing notice may employ any electronic form of messaging.

The e-mail inbox screen 700 shows a listing of messages 708, each of which is received from a sender 710 with a specified subject 712 and received at a noted date or time 714. Among the messages listed, while there are ordinary e-mail messages 716 that the user has received from other sources, there are also notifications 720 and 730 sent by a monitoring system to notify the user of the occurrence of a failure.

The first notification 720, which is the message most recently received, indicates the sender 710 of the message was the "Testing System" 722, indicating to the user that the message represents a failure notification. The subject 712 of the first notification 720 specifies the type of failure, specifying a "Failure—Mail Client—Build 11-28-2006" 724. The date 714 of the notification is 11-29-2006 726. The second notification 730 indicates the sender 710 of the message also was the "Testing System" 732. The subject 712 of the second notification 730 specifies the type of failure, specifying a "Failure—Mail Client—Build 11-27-2006" 734. The date 714 of the notification is 11-28-2006 736.

In the messages listed by the e-mail inbox screen 700, failure notifications 720 and 730 make clear at a glance by the user that the testing system seeks to notify the user of occurrences of failures summarized in the subject line 712 of each notification 720 and 730. When the user opens each of the notifications, further information is provided to the user, including information potentially allowing the user to access a held machine so that the user can study the state of the machine to try to resolve the cause of the failure reported.

FIG. 8 illustrates a notification message 800 received by the user. Specifically, the notification message 800 represents content of the notification 720 (FIG. 7) that the user received in the user's e-mail inbox screen 700. The notification message 800, like other e-mail messages, includes a from field 812 identifying the sender of the notification message; a to field 814 identifying the user and recipient of the notification message 800; a subject field 816 indicating the content of the notification message 800; and a received field 820 specifying when the notification message 800 was received. The from field 812 indicates that the sender was the testing system 830; the to field 814 indicates that the recipient is the user 832; the subject field 816 again communicates the content of the notification message 800 concerns "Failure—Mail Client—Build 11-28-2006" 834; and the received field communicates to the user that the notification message 800 was received at "11-29-2006—01:16:23 a.m." 836. The time the notification message 800 was received may be important, as suggested previously with reference to FIG. 4.

The content 840 of the notification message 800 informs the user in line 850 that this is an automatic notification of an execution failure for a named software program. Line 852 specifies the name of the failing software program, in this case, "Mail Client—Build 11-28-2006" and lists the failure type "Failure 10306." Line 854 indicates the time the failure occurred. Line 856 explains the reason the user is being notified, in this case, because there is an existing failure tag in the user's name that requested this notification. One should note, however, that the failure tag might not have requested that notice be given, or that the notice be given to someone else.

Line 858 identifies the failing machine or computing environment, "20A," and specifies that this computing environment is being held for 24 hours from the generation of this message. Thus, by comparing the comment of line 858 to the time 836 at which the notification message 800 was received, the user can determine how long he or she has to investigate the state of failing computing environment "20A" before the hold placed on the failing computing environment will lapse.

Line 860 provides information to the user describing how the user can access the failing computing environment. In one implementation, the user can use remote access to investigate the state of the failing computing environment from the workstation where the user has accessed the notification message 800. Specifically, line 862 provides a link the user can select to be connected to the failing computing environment using remote access.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method, comprising:
    monitoring a plurality of computing environments that are each executing a software program for notification of occurrences of a failure during execution of the software program in each of the computing environments; wherein the failure is an intermittent failure that does not occur each time a same instruction or group of instructions executes within the software program;
    recording failure information associated with each of the occurrences of the failure, the failure information including:
        identification of the software program; and
        a failure type describing the failure; and
    quantifying the failure information to maintain a total of at least one of a number of times:
        the software program has failed; and
        the failure type has been recorded; and
        ranking a number of times the software program has experienced the occurrences of failures in each of the computing environments and using the ranking to determine when to address the failure.

2. The method of claim 1, further comprising:
    monitoring execution of a plurality of software programs for occurrences of failures; and
    ranking the plurality of software programs according to a number of times each of the plurality of software programs has experienced the occurrences of failures.

3. The method of claim 2, further comprising providing a graphical view of the ranking of the failures.

4. The method of claim 1, further comprising:
    receiving a report from a failing computing system paused at a failure state following the occurrence of the failure;
    checking hold information describing whether to instruct the failing computing system to hold at the failure state; and
    instructing the failing system to hold at the failure state when the hold information indicates the failing system is to be held upon the occurrence of the failure reported.

5. The method of claim 4, wherein the hold information includes one of:
    submission data included in initiating the execution of the at least one software program indicating the execution of the at least one software program is to be held at the failure state upon occurrence of the failure; and
    when the failure report includes a failure type describing the occurrence of the failure, the hold information includes failure tag data indicating the execution of the at least one software program is to be held upon occurrence of a selected failure type including the failure type in the failure report.

6. The method of claim 5, further comprising, wherein on at least one second computing environment at least one additional software program executes in cooperation with an additional software program including at least one of another instance of the first software program and a second software program, instructing the second computing system to hold at a current state.

7. The method of claim 4, further comprising sending a failure message to a user named in the hold information that is to be notified upon the occurrence of the failure.

8. The method of claim 7, wherein the failure message includes access information configured to facilitate the user being able to access the failing computing system in order to investigate at least one of the failure state and the occurrence of the failure.

9. The method of claim 4, further comprising instructing the failing computing to hold at the failure state until at least one of:
    a time interval has lapsed;
    the failure state has been investigated; and
    a hold discontinue instruction is given.

10. The method of claim 4, further comprising:
    identifying an original user for whom the failing computing environment had been allocated prior to the occurrence of the failure;

allocating to the original user an additional computing environment to replace the failing computing system being held at the failure state.

11. A computer-readable medium having stored thereon computer-executable instructions, comprising:
  monitoring a plurality of computing environments executing at least one software program for notification of occurrences of a failure during execution of the at least one software program in each of the computing environments; wherein the failure is an intermittent failure that does not occur each time a same instruction or group of instructions executes within the at least one software program;
  detecting a failure report from a failing computing system paused at a failure state following the occurrence of the failure, the failure report identifying at least one of:
    the at least one software program; and
    a failure type describing the occurrence of the failure;
  checking hold information describing whether to instruct the failing computing system to hold at the failure state; and
  instructing the failing system to hold at the failure state for a predetermined time when the hold information indicates the failing system is to be held upon the occurrence of the failure reported.

12. The computer-readable medium of claim 11, wherein the hold information includes at least one of:
  submission data included in initiating the execution of the at least one software program indicating the execution of the at least one software program is to be held at the failure state upon occurrence of a first failure; and
  failure tag data indicating the execution of the at least one software program is to be held upon occurrence of a selected failure type indicated in the failure report.

13. The computer-readable medium of claim 11, further comprising at least one of:
  sending a failure message to a user named in the hold information that is to be notified upon the occurrence of the failure; and
  providing access information configured to facilitate the user being able to access the failing computing system in order to investigate at least one of the failure state and the occurrence of the failure.

14. The computer-readable medium of claim 11, further comprising, wherein on at least one second computing environment at least one additional software program executes in cooperation with an additional software program including at least one of another instance of the first software program and a second software program, instructing the second computing system to hold at a current state.

15. The computer-readable medium of claim 11, further comprising instructing the failing computing to hold at the failure state until at least one of:
  a time interval has lapsed;
  the failure state has been investigated; and
  a hold discontinue instruction is given.

16. The computer-readable medium of claim 11, further comprising:
  identifying an original user for whom the failing computing environment had been allocated prior to the occurrence of the failure;
  allocating to the original user an additional computing environment to replace the failing computing system being held at the failure state.

17. The computer-readable medium of claim 11, further comprising:
  recording failure information associated with the occurrence of the failure including at least one of:
    the identification of the software program; and
    the failure type describing the occurrence of the failure; and
  quantifying the failure information to maintain a total of at least one of a number of times:
    the software program has failed; and
    the failure type has been recorded.

18. A system for facilitating analysis of an occurrence of a failure occurring in a failing software system, comprising:
  a plurality of computing environments, each of the plurality of computing environments executing at least one software program being monitored and being configured to generate a failure message reporting an occurrence of failures occurring during execution of the at least one software program in each of the computing environments and provide failure information describing the occurrence of the failure; wherein the failure is an intermittent failure that does not occur each time a same instruction or group of instructions executes within the at least one software program;
  a monitoring system in communication with the plurality of computing systems and configured to receive the failure message; and
  one of:
    record the failure information; and
    respond to the failure message by instructing a failing computing system reporting the occurrence of the failure to hold at a failure state existing subsequent to the occurrence of the failure.

19. The system of claim 18, wherein the system is further configured to at least one of:
  quantify the failure information to maintain a total of at least one of a number of times:
    the software program has failed; and
  the failure type has been recorded; and
  rank:
  the number of times the software program has failed; and
  the number of times the failure type has been recorded.

20. The system of claim 18, wherein the system is further configured to at least one of:
  check hold information describing whether to instruct the failing computing system to hold at the failure state;
  instruct the failing system to hold at the failure state when the hold information indicates the failing system is to be held upon the occurrence of the failure reported; and
  at least one of:
    notify a user named in the hold information that is to be notified upon the occurrence of the failure; and
    provide access to the user to the failing computing system to allow the user to investigate at least one of the failure state and the occurrence of the failure.

* * * * *